Oct. 7, 1969    W. J. MAYER ETAL    3,471,696
METHOD OF MEASURING OIL CONSUMPTION IN AN ENGINE
Filed March 16, 1967    2 Sheets-Sheet 1

INVENTORS
Walter H. Lange,
William J. Mayer,
Douglas P. Krause &
Caleb P. Moore
BY Warren D. Hill
ATTORNEY

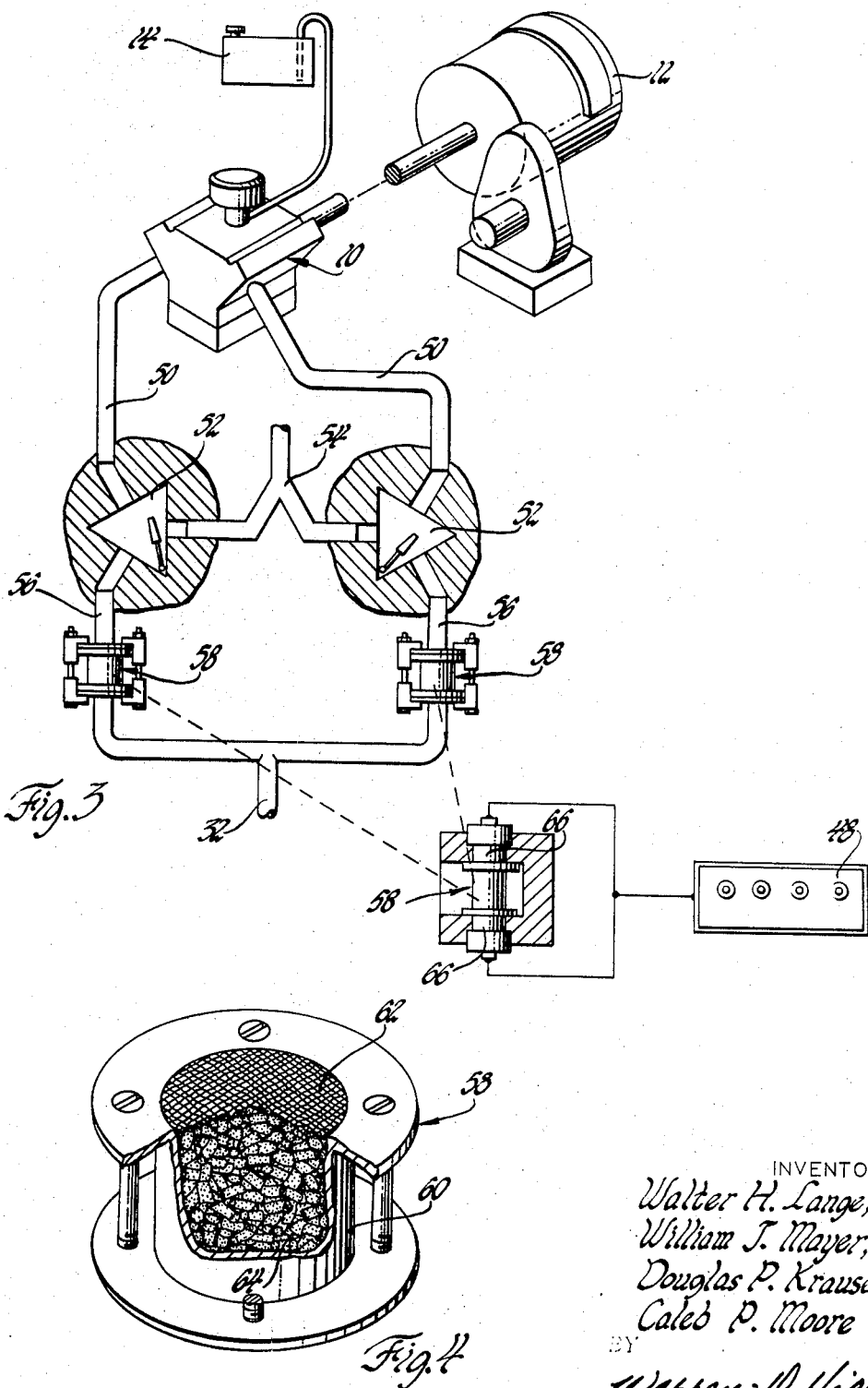

United States Patent Office 3,471,696
Patented Oct. 7, 1969

3,471,696
METHOD OF MEASURING OIL CONSUMPTION IN AN ENGINE
William J. Mayer, St. Clair Shores, Douglas P. Krause, Birmingham, Walter H. Lange, Fraser, and Caleb P. Moore, Utica, Mich., assignors to General Motors Corporation, Detroit, Mich., a corporation of Delaware
Continuation-in-part of application Ser. No. 482,302, Aug. 24, 1965. This application Mar. 16, 1967, Ser. No. 623,748
Int. Cl. G01t 1/02
U.S. Cl. 250—83
18 Claims

ABSTRACT OF THE DISCLOSURE

A method for measuring crankcase oil consumption comprising adding a radioactive halogen compound (1,2-dibromooctadecane) compound to the oil, operating the engine with lead-free fuel containing ethylene bromide and collecting the radioactive halide combustion products (HBr) from the exhaust gases wherein the activity of the collected sample is proportional to the oil consumption rate. The tracer is collected by reacting with a basic solution (NaOH) in an extraction tower or in a canister containing porous pellets soaked with the basic solution.

---

This is a continuation-in-part of S.N. 482,302, filed Aug. 24,, 1965, now abandoned.

This invention relates to a method for measuring crankcase oil consumption and, more particularly, to a method of measuring crankcase oil consumption in a combustion engine by radioisotope tracer techniques.

Heretofore when it has been necessary to measure crankcase oil consumption in an internal combustion engine for purposes of testing an engine or a lubricant, two methods have been used. The most widely used method is to weigh the crankcase oil before it is added to the engine and, after operating the engine for an extended test period, to drain the oil from the engine and weigh it again to determine the amount of oil loss. The second method has been to use a calibrated dipstick. Each of these methods suffers from several disadvantages. First, they are inherently inaccurate. In the oil weight method it is impossible to completely drain all of the oil from the engine for the second weight measurement and in the calibrated dipstick method the very small change in engine oil level can represent a large change in oil volume. Neither method is sensitive to very small changes of oil loss, an, accordingly, an engine must be run for a long period of time to produce a measurable oil loss. Even then it is not possible to make an exact measurement for specified operating conditions since for each test the engine must undergo a start-up as well as a warming-up period. This is especially true for the oil weigh method. Further, since each individual test requires several hours of operation, considerable wear can take place in the engine and the oil consumption rate can actually change appreciably during the test. Moreover, to properly evaluate the oil consumption characteristics of an engine it is necessary to make a great many individual measurements under various operating conditions so that curves representing oil consumption vs. engine load can be plotted for several different engine speeds. It would require about a month of engine operation to obtain data for a complete family of such curves and during this time the condition of the engine can, of course, change considerably. It is not possible by these methods to measure the oil consumption rate during the break-in period of an engine or during transient conditions of acceleration or load nor in addition, is it possible to test the oil consumption performance of an individual cylinder.

It has been proposed to use radioactive crankcase oil and to somehow measure the radioactivity of th exhaust gases to determine the oil consumption rate. Heretofore such approaches have not yielded a practical way of accurately measuring oil consumption since they are generally tied in with the oil weigh method for calibration purposes and consequently are limited by the disadvantages discussed above. In addition, these methods are limited to measurement of the oil consumption of an entire engine and no method is provided for measuring the oil consumption of an individual cylinder.

In addition, prior to the present invention, investigation of oil consumption was, of necessity, limited to laboratory or track studies of a few test engines. There was no method suitable to test an appriciable portion of engines coming off a production line.

It is therefore an object of this invention to provide a method of measuring crankcase oil consumption which is both rapid and accurate.

It is a further object to provide a method which determines the actual oil consumption rate for a specific engine operating condition.

It is another object to provide a method of measuring oil consumption of an individual cylinder in a multi-cylinder engine.

It is still another object to provide a method suitable for measuring the oil consumption of at least a substantial proportion of all engines made on a production line.

It is yet another object to provide a method for extracting radioactive tracers from engine exhaust gases.

The invention is carried out by using a radioactive tracer in the crankcase oil, operating the engine with a fuel containing a special additive or otherwise supplying an additive to the combustion chamber, collecting the tracer element from the exhaust gases and detecting radioactivity of such tracer. More particularly, this invention is carried out by using a crankcase oil containing a radioactive bromine compound, operating the engine with a lead-free fuel having a halide additive such as ethylene bromide, collecting the bromide combustion products from the exhaust gases as by reacting with sodium hydroxide, detecting the radioactivity of the resultant solution and comparing this with the specific activity of the crankcase oil.

The invention is further carried out by removing radioactive combustion products from an exhaust gas by providing a container containing porous material, adding a basic reagent to the porous material and passing the exhaust gases therethrough for reaction with the reagent.

The above and other advantages of the invention will be made more apparent from the following description taken in conjunction with the accompanying drawing wherein like reference numerals refer to like parts and wherein:

FIGURE 3 is a schematic representation of the apparatus used to carry out a second method according to the invention; and FIGURE 4 is a partly broken away perspective view of a collection canister for the apparatus of FIGURE 3.

Figure 1:
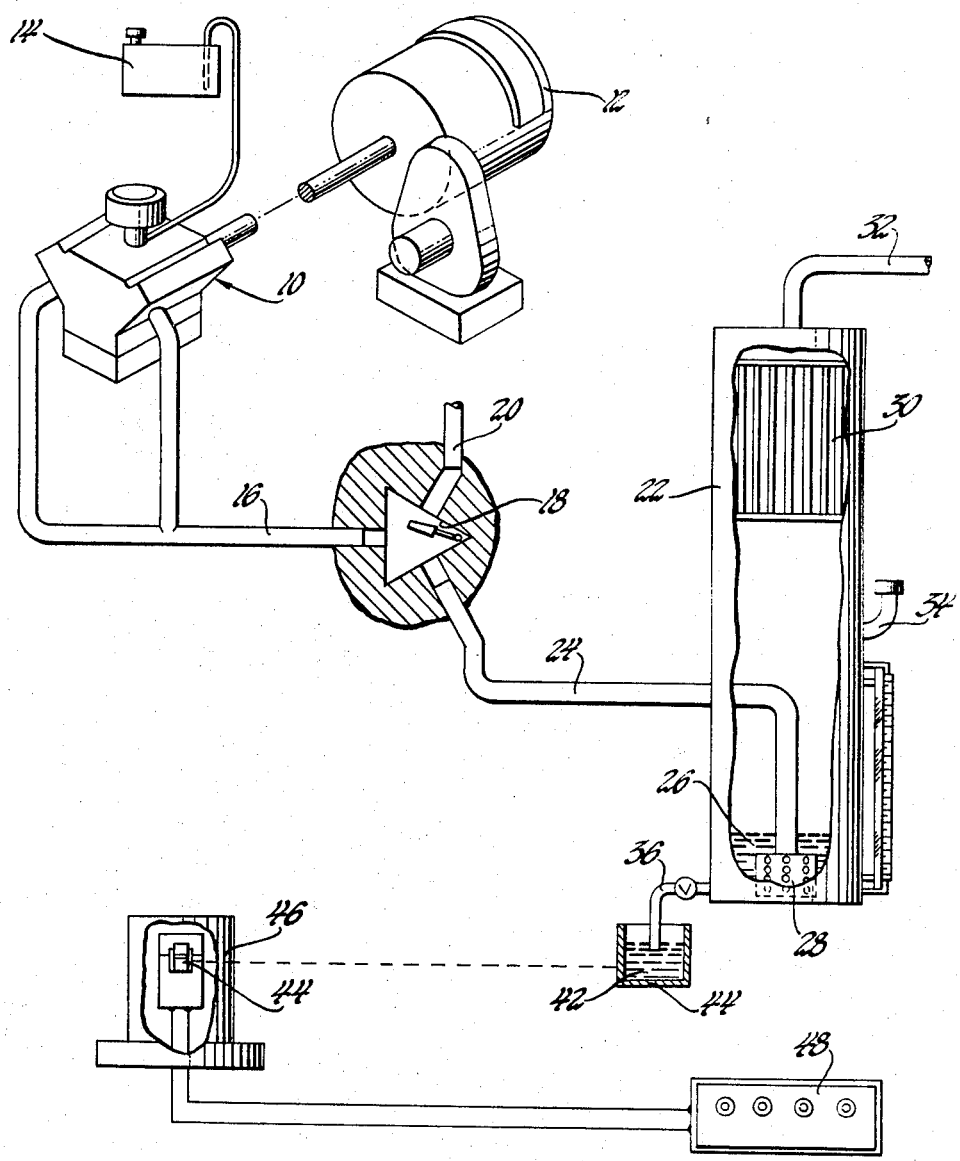
FIGURE 1 is a schematic representation of the apparatus used to carry out the method of the invention.

We have found that very accurate measurements of crankcase oil consumption rate can be determined by our method, requiring only a few minutes running time of an engine under a given set of operating conditions. To carry out our method we use an engine oil containing a radioactive halogen additive which is stable under engine operating conditions and which, after entering a combustion chamber during operation, forms a halide which can be readily collected from the exhaust gases. The radioactivity of a sample of the collected halide compound is detected and compared to the specific activity of the crankcase oil to determine the amount of oil consumed during the period of engine operation. Of the halogens, iodine and bromine are preferred as tracers but bromine is superior due to the stability of its compounds when heated.

It has been found that this method gives the most accurate results under all engine operating conditions when the engine fuel is lead-free and contains a special additive. The reason the additive is required is not fully understood; however, it is noted that at low engine loads the measured oil consumption was much lower than the actual oil consumption thus indicating that the tracer somehow failed to be collected from the exhaust gases. It was learned, however, that the addition of a stabilizer or carrier such as an ethylene halide corrected this fault and permitted the collection of the tracer. It is believed that the loss of the tracer is due to small amounts of it reacting with or being absorbed by something in the engine. These small amounts can represent a large percentage of the tracer since only traces of the radioactive material are present in the combustion chamber and exhaust system. By adding to the system relatively large amounts of a non-radioactive compound the same as or similar to the tracer material, then most of the reacted or absorbed material will be supplied by the non-radioactive compound and relatively small amounts of the tracer compound will be lost. This non-radioactive compound is referred to herein as a stabilizer, carrier or tracer carrier. Under some conditions the carrier may not be required; however, it is to be understood that small amounts of a carrier are to be used when needed. While several carrier materials may be useful in practicing this invention, ethylene bromide has been outstandingly successful in that extremely accurate results have been obtained through its use. Other advantages of ethylene bromide are that it is economical and readily available since it is a conventional additive for use with leaded gasolines, its function there being to react with the lead to avoid lead deposits in the engine. When leaded fuel containing ethylene bromide is used during oil consumption tests, it has been found that excessive amounts of ethylene bromide are required and that these amounts are deleterious to the engine and, in addition, may cause malfunction of the engine which could result in spurious test results. Only very small amounts of ethylene bromide added to lead-free gasoline are required. Tests have been made with 1–7 cc. of ethylene bromide per gallon of gasoline and no difference in performance or test results was noted throughout that range but the results are significantly different when the carrier or stabilizer is omitted.

A bromide compound is preferred as the radioactive crankcase oil additive for several reasons: Its gamma radiations are readily detectable; it can be formulated into a compound which is very stable under engine operating conditions; and it has a very convenient 36-hour half-life. It decays slowly enough that it can be used for many hours for a series of tests and yet it presents no disposal problem because after several days its radioactivity is essentially gone. A most important characteristic of bromine is that it can be easily collected from the exhaust gases by reaction with a sodium hydroxide solution for detection of its radioactivity. We prefer to use as an oil additive, 1,2-dibromo-octadecane synthesized from radioactive bromine, although other compounds such as 9,10-dibromo-stearic acid have been used successfully. These compounds have proven to be very stable when used as a crankcase oil additive.

During engine operation when crankcase oil enters a combustion chamber, the tracer compound forms hydrogen bromide which is carried into the exhaust gases. The exhaust gases are passed through a sodium hydroxide solution for reaction therewith so the bromide is captured in the solution as sodium bromide. The radioactivity of a sample of the solution is measured. Since the activity of the sample is proportional to the amount of oil consumed by the engine, the oil consumption rate is readily computed.

FIGURE 1 of the drawings generally illustrates test apparatus used to carry out the method of the invention. An engine 10 drives a dynamometer 12 so that predetermined load conditions may be applied to the engine by adjustment of the dynamometer settings. Fuel is supplied to the engine from tank 14. An exhaust tube 16 carries the exhaust gases from the engine 10 to a diverter valve 18. This valve can be positioned to exhaust the gases to the atmosphere via tube 20 or, alternately, to divert the gases to an extraction tower 22 by means of the tube 24. (By suitable dilution of the exhaust gases with air the activity of the exhaust gases does not exceed safe limits when discharged into the atmosphere.) The tower 22 is about 9 feet tall and 12 inches in diameter. The extraction tower contains several inches of a sodium hydroxide solution 26 in the bottom thereof. A diffuser 28 connected to the tube 24 is immersed in the solution 26 and is adapted to diffuse the exhaust gases through the sodium hydroxide in an efficient manner to obtain maximum contact of the gases with the solution to react the hydrogen bromide in the gas with sodium hydroxide. A condenser 30 in the top of the extraction tower prevents excessive loss of water from the tower. The gases are emitted from the top of the tower and vented to the atmosphere through tube 32. A filler tube 34 on the side of the tower permits addition of the sodium hydroxide solution to the tower and a drain 36 at the bottom of the tower permits a means of draining the sodium hydroxide solution from the tower.

Figure 2:
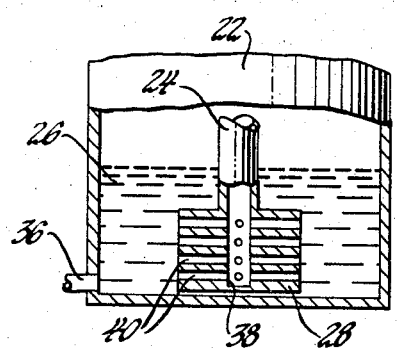
FIGURE 2 is a cross-sectional view of the diffuser shown in FIGURE 1.

In FIGURE 2 the diffuser 28 is shown in detail. The diffuser comprises a cylindrical block having a central bore 38 connected to the exhaust tube 24. An array of small passages 40 radiating from the central bore 38 diffuse the exhaust gases into the solution 26. The diffuser is designed to produce an exhaust gas pressure drop as small as possible and, accordingly, the combined cross-sectional area of the radiating passages 40 approximates the area of exhaust tube 24. Thus where the exhaust tube has an internal diameter of 2 niches, the diffuser comprises 350 radial passages each having a diameter of 1/6 inch.

Referring again to FIGURE 1, after the exhaust gas has been passed through the sodium hydroxide solution for a predetermined period, a sample 42 of the solution is taken from the tower via the drain 36 and is collected in a sample holder 44. As indicated by the dotted line, the sample holder 44 is transferred to a well-type scintillation detector 46 where the radiations are detected and counted by a scaler 48.

A specific example of the preferred manner of carrying out the method is as follows: The apparatus is calibrated by determining the collector efficiency. This is done by operating the engine using non-radioactive crankcase oil and bromine-free gasoline and injecting a known amount of non-radioactive hydrogen bromide into the exhaust system and passing the exhaust gases through the sodium hydroxide in the extraction tower. By analyzing the resultant sodium hydroxide-sodium bromide solution as by X-ray fluorescence to determine the amount of the bromide collected, the efficiency of the tower can be calculated. This step is repeated for various engine operating conditions. It has been found that the tower efficiency remains almost constant for all engine operating conditions. In preparation of the tracer additive, ½ cc. of bromine having an activity of 40 to 80 millicuries is reacted with 1-octadecane to produce 10 cc. of 1,2-dibromo-octadecane. This active compound is diluted with 15 cc. of carbon tetrachloride and is mixed with 4 quarts of oil in the crankcase. The engine fuel is isooctane gasoline or any non-leaded fuel containing about 4 ml. of ethylene bromide per gallon. The engine is run for about one hour to insure a homogeneous mixture of crankcase oil. A sample of 0.01 cc. of oil is taken from the crankcase and the radioactivity thereof is measured. This sample is used thereafter as an oil standard so long as the same oil is in the engine. The system is now prepared for the first oil consumption test. Twenty liters of a one-molar solution of sodium hydroxide solution are placed in the extraction tower so that the level of the solution in the tower is about 6 inches above the diffuser. The engine thus far has been operating with the diverter valve 18 positioned so as to vent the exhaust gases to atmosphere. The engine and dynamometer are set to any desired speed and load condition and the diverter valve is moved to pass the exhaust gases through the extraction tower for three minutes and then the diverter valve is moved back to its initial position. A 20 ml. sample of the sodium hydroxide-sodium bromide solution is drained from the tower into the sample holder 44 and the radiation of the sample is measured for one minute in a well-type sodium iodide scintillation crystal detector. This concludes the test for one engine operating condition. The oil consumption rate in terms of miles per quart is then computed in a straightforward manner according to the following formulae:

$$\frac{miles}{quart} = \frac{miles/hour}{quarts/hour} = \frac{miles/hour}{\frac{a}{e} \times \frac{V}{v} \times \frac{1}{t} \times \frac{1}{A} \times K}$$

where:

$a$ = activity of the sample (counts/minute)
$e$ = efficiency of the extraction tower
$V$ = volume of sodium hydroxide solution (ml.)
$v$ = volume of the sample (ml.)
$t$ = time of the test (minutes)

$A$ = specific activity of the oil $\left(\frac{counts/minute}{ml.}\right)$ $K$ = conversion constant $\left(6.35 \times 10^{-2} \frac{quarts/hour}{ml./minute}\right)$ Thus in a typical test where the sample activity is $2.5 \times 10^4$ counts per minute, the tower efficiency is 65%, the volume of the NaOH is $2 \times 10^4$ ml., the volume of the sample is 20 ml., the time of the test is three minutes, the specific activity of the oil is $2 \times 10^7$ counts per minute, and the engine is running at a speed representing 50 miles per hour, the oil consumption rate is 1200 miles/quart.

A successive test for another operating condition may be performed immediately, it being necessary only to replace the sodium hydroxide solution with fresh solution and repeat the above procedure. If desired, the sodium hydroxide used in the first test may be reused for subsequent tests but the amount of radioactivity caused by the previous tests must be taken into account for each computation of the oil consumption rate. In performing subsequent tests it is unnecessary to redetermine the efficiency of the extraction tower. For subsequent tests the change of activity of the engine oil due to decay is taken into account by reference to the oil standard.

It has been found that the sensitivity of this method is such that approximately $10^{-7}$ quart (roughly $\frac{1}{100}$ of an oil drop) in the exhaust gases can be detected and measured.

To run a complete set of oil consumption curves representing oil consumption vs. engine load for various engine speeds requires about 36 individual measurements. This can be accomplished by the method of this invention in approximately four hours whereas heretofore a period of 360 hours was required to obtain similar data by the oil weigh method. The data obtained by the method of this invention is in general agreement with data obtained by the oil weigh method but is believed to be much more accurate due to the remarkable sensitivity of this method coupled with the fact that the tests are completed in a short time whereas the oil weigh method required such long periods of operation that the continuous wearing of the engine actually caused changes in its oil consumption characteristics before the test was completed.

It is apparent that the oil consumption characteristics of a single cylinder of an engine can be measured by using a specialized exhaust manifold which will lead the exhaust from only one cylinder to the extraction tower. It will also be apparent that, since the tests are performed in a short period of time, it is practical to evaluate the oil consumption characteristics of a new engine during its break-in period.

While the specified method described above is very accurate and has found industrial acceptance as a research and development tool, it is, without more, limited to such applications as opposed to the mass testing of engines on a production line because of the amount of radioactivity required to be used in each engine. Aside from the high cost of the radioactive material, the requirement of about 80 millicuries of activity per engine is about five thousand times greater than that which legally may be shipped from the factory. An alternative method has therefore been devised for use in testing a substantial portion of production engines. This method is the same as that described above except that the amount of radioactivity required for each engine is only 15 microcuries and the manner of collecting the radioactive tracer from the exhaust gases is changed to eliminate the bulky extraction tower and more importantly, to enable the detection and counting of the entire collected sample instead of a small proportion of the sample as used in the above described method.

Referring to FIGURE 3, the engine being tested is depicted as a standard V engine 10 with separate exhaust pipes 50 extending from each bank of cylinders. Each exhaust pipe contains a diverter valve 52 which selectively passes the gases to an outlet 54 to atmosphere or through further exhaust lines 56 to a tracer collecting device. Each tracer collecting device (one for each bank) comprises a canister 58 removably clamped to its respective exhaust line 56 so that the exhaust gases pass therethrough.

As best shown in FIGURE 4, the canister 58 comprises a steel cylinder 60 of three inches internal diameter and two inches depth covered at each end with a stainless steel mesh 62 and containing a quantity of porous material 64. Preferably, the porous material 64 is a plurality of molecular sieve pellets of sodium aluminum silicate. In our operations, we used pellets of $\frac{1}{8}$ inch diameter and about $\frac{1}{4}$ pound to fill each canister. Other types of porous material such as charcoal may be used. In use, the canisters are dipped in a two-molar sodium hydroxide solution and the solution is retained within the canister by the pores of the sieves. The canisters are clamped in the exhaust lines and with the engine operating at the desired speed and load, the two diverter valves are operated simultaneously and the exhaust gases are passed through the canisters for a predetermined time, usually one minute. The sodium hydroxide reacts with the hydrogen bromide to thereby collect the radioactive bromine within the canisters. Then the canisters are removed and each analyzed for activity with two three-inch sodium iodide scintillation crystals 66. The crystals are electronically coupled so that the total count rate from both crystals will be recorded by scaler 48. The amount of activity is proportional to oil consumption.

The specific oil consumption rate measured in miles per quart is calculated as follows:

$$\frac{miles}{quart} = \frac{miles/hour}{a \times \frac{1}{t} \times \frac{1}{A} \times 6.35 \times 10^{-2}}$$

where $a$ = combined activity of the two samples (counts/minute)
$t$ = time of the test (minutes)
$A$ = specific activity of the oil $\left(\dfrac{\text{counts/minute}}{\text{ml.}}\right)$ The radioactive tracer collection efficiency of the canisters is essentially 100% so that that factor need not be considered.

Thus by this method, it is economically practical to make oil consumption measurements on a large number of production engines and there is the additional advantage that since each bank of the engine is monitored separately, it is convenient when a defective engine is found to determine which bank is defective by noting which canister produces an extraordinary count rate. Another favorable aspect of this method is that the canisters, after having been used, can be soaked in water to remove the sodium bromide collected therein and the canister may be reused several times before the porous material requires replacement.

This method may be practiced by other than a canister of porous pellets. For example, a suitable container including filter paper treated with a reagent may be used in place of the canister. If the filter paper is a large sheet it may be folded or crumpled after the test to conform to the geometry of the radioactivity detecting apparatus.

While preferred embodiments of the invention have been applied herein to an internal combustion engine, the method may be applied as well to any combustion engine where it is desired to measure the oil consumptions thereof. Other variations of the method may be carried out within the scope of the invention and the invention is to be limited only by the following claims.

We claim:

1. A method of measuring crankcase oil consumption of a combustion engine comprising adding a radioactive bromine tracer to the crankcase oil, operating the engine with fuel containing a carrier for said tracer, collecting the tracer from the engine exhaust gases for a known time period and detecting the activity of the collected tracer whereby the detected activity is proportional to the oil consumption.

2. A method of measuring crankcase oil consumption of a combustion engine comprising adding a radioactive bromine tracer to the crankcase oil, supplying a carrier for said tracer to the engine combustion chamber, operating the engine, collecting the tracer from the engine exhaust gases for a known time period and detecting the activity of the collected tracer whereby the detected activity is proportional to the oil consumption.

3. A method of measuring crankcase oil consumption of a combustion engine comprising adding a radioactive tracer to the crankcase oil, operating the engine with lead-free fuel containing a carrier for said tracer, collecting the tracer from the engine exhaust gases for a known time period and detecting the activity of the collected tracer whereby the detected activity is proportional to the oil consumption.

4. A method of measuring crankcase oil consumption of a combustion engine comprising operating an engine having crankcase oil containing a radioactive bromine tracer, supplying a bromide to the combustion chamber of the engine, collecting a sample of the radioactive bromine from the engine exhaust gases for a fixed period of time, detecting the activity of the sample and comparing the activity of the sample to the specific activity of the crankcase oil to determine the oil consumption of the engine.

5. A method of measuring crankcase oil consumption of a combustion engine comprising operating an engine having crankcase oil containing a radioactive bromine tracer, feeding fuel containing a bromide to the engine, collecting a sample of the radioactive bromine from the engine exhaust gases for a fixed period of time, detecting the activity of the sample and comparing the activity of the sample to the specific activity of the crankcase oil to determine the oil consumption of the engine.

6. A method of measuring crankcase oil consumption of a combustion engine comprising operating an engine having crankcase oil containing a radioactive halogen tracer, feeding lead-free fuel containing an ethylene halide to the engine, collecting a sample of the radioactive halide from the engine exhaust gases for a fixed period of time, detecting the activity of the sample and comparing the activity of the sample to the specific activity of the crankcase oil to determine the oil consumption of the engine.

7. A method of measuring crankcase oil consumption of a combustion engine comprising operating an engine having crankcase oil containing a radioactive bromine tracer, feeding lead-free fuel to the engine, supplying a carrier for said tracer to the engine, collecting a proportionate sample of the radioactive bromine from the engine exhaust gases for a fixed period of time, detecting the activity of the sample and comparing the activity of the sample to the specific activity of the crankcase oil to determine the oil consumption of the engine.

8. A method of measuring crankcase oil consumption of a combustion engine comprising operating an engine having crankcase oil containing a radioactive bromine tracer, feeding lead-free fuel containing a carrier for said tracer to the engine, collecting a sample of the radioactive bromide from the engine exhaust gases for a fixed period of time, detecting the activity of the sample and comparing the activity of the sample to the specific activity of the crankcase oil to determine the oil consumption of the engine.

9. A method of measuring crankcase oil consumption of one cylinder of a multi-cylinder internal combustion engine comprising adding a radioactive tracer to the crankcase oil, operating the engine with lead-free fuel containing a carrier for said tracer, collecting the tracer from the exhaust gases from one cylinder of the engine for a known time period and detecting the activity of the collected tracer whereby the detected activity is proportional to the oil consumption.

10. A method of measuring crankcase oil consumption of one cylinder of a multi-cylinder internal combustion engine comprising operating an engine having crankcase oil containing 9,10-dibromo-stearic acid having a radioactive bromine tracer, feeding fuel containing ethylene bromide to the engine, collecting a sample of the radioactive bromine from the engine exhaust gases from one cylinder of the engine for a fixed period of time, detecting the activity of the sample and comparing the activity of the sample to the specific activity of the crankcase oil to determine the oil consumption of the cylinder.

11. A method of measuring crankcase oil consumption of a combustion engine comprising operating an engine having crankcase oil containing 1,2-dibromo-octadecane having a radioactive bromine tracer, feeding lead-free fuel containing ethylene bromide to the engine, collecting a sample of the radioactive bromine from the engine exhaust gases for a fixed period of time, detecting the activity of the sample and comparing the activity of the sample to the specific activity of the crankcase oil to determine the oil consumption of the engine.

12. A method of measuring crankcase oil consumption of a combustion engine comprising operating an engine having crankcase oil containing 9,10-dibromo-stearic acid having a radioactive bromine tracer, feeding lead-free fuel containing ethylene bromide to the engine, collecting a sample of the radioactive bromine from the engine exhaust gases for a fixed period of time, detecting the activity of the sample and comparing the activity of the sample to the specific activity of the crankcase oil to determine the oil consumption of the engine.

13. A method of measuring crankcase oil consumption of a combustion engine comprising adding to the crankcase oil 1,2-dibromo-octadecane containing radioactive bromine, operating the engine with lead-free fuel containing ethylene bromide whereby consumed 1,2-dibromo-octadecane produces hydrogen bromide, reacting the hydrogen bromide with a sodium hydroxide solution to collect the bromide from the exhaust gases, and detecting the activity of the resultant solution whereby the detected activity is proportional to the oil consumption.

14. A method of measuring crankcase oil consumption of a combustion engine comprising adding to the crankcase oil 1,2-dibromo-octadecane containing radioactive bromine, operating the engine with lead-free fuel containing ethylene bromide whereby consumed 1,2-dibromo-obtadecane produces hydrogen bromide, extracting the hydrogen bromide from the exhaust gases by reacting it with a sodium hydroxide solution, and detecting the activity of the resultant solution whereby the detected activity is proportional to the oil consumption.

15. A method of measuring crankcase oil consumption of a combustion engine comprising adding to the crankcase oil 9,10-dibromo-stearic acid containing radioactive bromine, adding non-radioactive ethylene bromide to non-leaded engine fuel, operating the engine with lead-free fuel containing ethylene bromide whereby consumed 9,10-dibromo-stearic acid produces hydrogen bromide, extracting the hydrogen bromide from the exhaust gases by reacting it with a sodium hydroxide solution, and detecting the activity of the resultant solution whereby the detected activity is proportional to the oil consumption.

16. In a method of measuring crankcase oil consumption of a combustion engine comprising adding a radioactive tracer to the crankcase oil, operating the engine with fuel containing a carrier for said tracer whereby a portion of the radioactive tracer appears in a combustion product in the engine exhaust gases, providing a quantity of porous material containing a reagent, reacting the combustion product with the reagent by passing the exhaust gases through the porous material so that the tracer is retained in the porous material, and detecting the activity of the retained tracer, whereby the detected activity is proportional to the oil consumption.

17. In a method of measuring crankcase oil consumption of a combustion engine comprising adding a radioactive tracer to the crankcase oil, operating the engine with lead-free fuel containing a carrier for said tracer; whereby a portion of the radioactive tracer appears in a combustion product in the engine exhaust gases, preparing a collection canister by filling a container with porous pellets and soaking the pellets within the container with a liquid reagent, passing the exhaust gases through the canister thereby reacting the combustion product with the reagent so that the tracer is retained in the canister, and detecting the activity of the retained tracer whereby the detected activity is proportional to the oil consumption.

18. A method of measuring oil consumption of a combustion engine comprising operating an engine having crankcase oil containing a radioactive halogen tracer to thereby produce a radioactive halide combustion product, feeding lead-free fuel containing an ethylene halide to the engine, providing a canister containing porous material, wetting the porous material with an alkaline liquid, collecting a sample of the radioactive halide by passing the combustion product through the canister and reacting the halide with the alkaline liquid, detecting the activity of the sample, and comparing the activity of the sample to the specific activity of the crankcase oil to determine the oil consumption of the engine.

References Cited

UNITED STATES PATENTS 2,939,011  5/1960  Bisso et al.
2,957,986  10/1960  Quigg.
3,179,806  4/1965  Dixon et al.

ARCHIE R. BORCHELT, Primary Examiner

U.S. Cl. X.R.
250—106

PO-1050
(5/69)

UNITED STATES PATENT OFFICE
CERTIFICATE OF CORRECTION

Patent No. 3,471,696  Dated October 7, 1969

Inventor(s) William J. Mayer, Douglas P. Krause, Walter H. Lange & Caleb P. Moore It is certified that error appears in the above-identified patent and that said Letters Patent are hereby corrected as shown below:

In Column 1, line 44, change "weight" to -- weigh, line 49 change "an" to -- and --. Column 2, line 2, after "th" insert -- e --, line 15, change "appriciable" to -- appreciable --. Column 4, line 42, change "niches" to -- inches --, line 44, change "1/6" to -- 1/8 --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents